(12) United States Patent
Bell et al.

(10) Patent No.: US 6,360,840 B1
(45) Date of Patent: *Mar. 26, 2002

(54) APPARATUS AND METHOD FOR CONTROLLING TEMPERATURE OF FLUID IN A DIFFERENTIAL ASSEMBLY

(75) Inventors: Douglas W. Bell, Mattoon; David W. Bruce, Decatur; David R. Hinton, Mt. Zion, all of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/589,897

(22) Filed: Jun. 7, 2000

Related U.S. Application Data (63) Continuation-in-part of application No. 09/196,043, filed on Nov. 19, 1998, now Pat. No. 6,092,628.
(60) Provisional application No. 60/102,064, filed on Sep. 28, 1998.
(51) Int. Cl.[7] ............................................... B60K 17/00
(52) U.S. Cl. ...................................................... 180/339
(58) Field of Search .......................... 180/339; 74/467, 74/468, 606 R, 607, 606 A (56) References Cited

U.S. PATENT DOCUMENTS 4,915,192 A * 4/1990 Hayashida et al. ......... 180/309

6,132,329 A * 10/2000 Tison ......................... 475/160

* cited by examiner

Primary Examiner—Paul N. Dickson
Assistant Examiner—Faye M. Fleming
(74) Attorney, Agent, or Firm—Maginot, Addison & Moore (57) ABSTRACT

An apparatus for controlling temperature of fluid in a rear axle assembly includes a rear axle housing having an internal component chamber. The internal component chamber has a rear axle sump located therein. The apparatus also includes a temperature control operational pressure source coupled to the internal component chamber. The apparatus further includes a diverter valve coupled to the temperature control operational pressure source. The apparatus includes a heating fluid return line interposed between the diverter valve and the rear axle sump, and includes a cooling fluid return line interposed between the diverter valve and the rear axle housing. The temperature control operational pressure source is selectively operable between (i) a first rate mode in which it advances fluid from the internal component chamber at a first flow rate, and (ii) a second rate mode in which it advances fluid from the internal component chamber at a second flow rate. The diverter valve is selectively operable between (i) a heating position in which fluid advanced by the temperature control operational pressure source is diverted to the rear axle sump via the heating fluid return line, and (ii) a cooling position in which fluid advanced by the temperature control operational pressure source is diverted to the rear axle housing via the cooling fluid return line. A method of controlling temperature of fluid in a rear axle housing is also presented.

26 Claims, 1 Drawing Sheet

Fig. 1

APPARATUS AND METHOD FOR CONTROLLING TEMPERATURE OF FLUID IN A DIFFERENTIAL ASSEMBLY

DESCRIPTION

This application is a continuation-in-part of U.S. patent application Ser. No. 09/196,043, filed Nov. 19, 1998 now U.S. Pat. No. 6,092,628, which in turn claims the benefit of U.S. Provisional Application Ser. No. 60/102,064, filed Sep. 28, 1998.

TECHNICAL FIELD

The present invention relates generally to a rear axle assembly of a work machine, and more particularly to an apparatus and method for controlling the temperature of fluid in a rear axle assembly.

BACKGROUND ART

Work machines, such as mining trucks, typically include a rear axle assembly which powers the rear tires and supports the rear of the machine. The rear axle assembly includes a left wheel group, a right wheel group, and a rear axle housing. The rear axle assembly mechanically couples the right and left wheel groups. This rear axle assembly allows the right and left wheels to rotate at different speeds relative to one another as the work machine is driven in a curved path.

The rear axle assembly has an internal component chamber which houses a number of components. For example, one internal component chamber houses side gears and pinion gears. Adequate lubrication of the aforementioned components by a fluid, such as oil, is an important factor in maintaining the proper operation of the rear axle assembly. For example, the oil contained within the rear axle assembly must adequately lubricate the right wheel group and the left wheel group in order for the work machine to operate properly.

Moreover, having the oil within an appropriate predetermined temperature range is also an important factor in maintaining the proper operation of the rear axle assembly. For example, during cold start up conditions the oil contained within the internal component chamber must be heated to be within the appropriate predetermined temperature range. On the other hand, once the work machine begins performing various work functions, the oil must be cooled such that the oil is maintained within the predetermined temperature range.

Some rear axle assembly designs maintain a level of oil in the internal component chambers such that the gears contained therein are continuously in contact with the oil pooled therein. Having the gears in contact with the pooled oil results in the oil being heated due to the physical interaction between the oil and the gears. Specifically, the rotation of the gears through the pool of oil causes the temperature of the oil to rise. While rotating the gears through the pool of oil is an effective method of heating the oil, it also requires a significant amount of power. Therefore, having the gears contained within the internal component chamber of the rear axle assembly continuously in contact with a pool of oil results in the work machine losing a significant amount of horse power as the gears are rotated through the oil. This is particularly true when the gears being rotated through the pool of oil are relatively large as is the case with mining trucks.

What is needed, therefore, is an apparatus and method for controlling the temperature or chamber level of fluid in a rear axle assembly which overcomes the above-mentioned drawback.

DISCLOSURE OF THE INVENTION

In accordance with a first embodiment of the present invention, there is provided an apparatus for controlling temperature of fluid in a rear axle assembly. The apparatus includes a rear axle housing having a number of sidewalls which collectively define an internal component chamber. The internal component chamber has a rear axle sump located therein, and the rear axle sump has a sump input port defined therein. The apparatus also includes a temperature control operational pressure source coupled to the internal component chamber of the rear axle housing to advance fluid therefrom. The apparatus further includes a diverter valve coupled to the temperature control operational pressure source to receive fluid advanced from the internal component chamber by the temperature control operational pressure source. The diverter valve has a cold fluid output port and a hot fluid output port. The apparatus includes a heating fluid return line interposed between the cold fluid output port of the diverter valve and the sump input port of the rear axle sump, and includes a cooling fluid return line interposed between the hot fluid output port of the diverter valve and a housing input port of the wheel group filters. The temperature control operational pressure source is selectively operable between (i) a first rate mode in which it advances fluid from the internal component chamber of the rear axle housing to the internal component chamber of the rear axle assembly at a first flow rate, and (ii) a second rate mode in which it advances fluid from the internal component chamber of the rear axle housing to the internal component chambers of the wheel groups. Additionally, the diverter valve is selectively operable between (i) a heating position in which fluid advanced by said temperature control operational pressure source is diverted to said rear axle sump of said rear axle housing via said heating fluid return line, and (ii) a cooling position in which fluid advanced by said temperature control operational pressure source is diverted to said housing input port of said rear axle housing via said cooling fluid return line.

In accordance with a second embodiment of the present invention, there is provided an apparatus for controlling temperature of fluid in a rear axle assembly. The apparatus includes a rear axle housing having a number of sidewalls which collectively define an internal component chamber. The internal component chamber has a rear axle sump located therein, and the rear axle sump has a sump input port defined therein. The apparatus also includes a temperature control operational pressure source coupled to the internal component chamber of the rear axle housing to advance fluid therefrom. The apparatus further includes a diverter valve coupled to the temperature control operational pressure source to receive fluid advanced from the internal component chamber by the temperature control operational pressure source. The diverter valve has a cold fluid output port and a hot fluid output port. The apparatus includes a heating fluid return line interposed between the cold fluid output port of the diverter valve and the sump input port of the rear axle sump, and includes a cooling fluid return line interposed between said hot fluid output port of said diverter valve and a housing input port of the rear axle housing. The housing input port of the rear axle housing is in fluid communication with a is wheel group assemblies. Additionally, the temperature control operational pressure source is selectively operable between (i) a mode in which it advances fluid to a left wheel group and a right wheel group and (ii) a mode in which it advances fluid to a sump. Also, the diverter valve is selectively operable between (i) a heating position in which fluid advanced by the temperature control operational pressure source is diverted to the rear axle sump of the rear axle housing via the heating fluid return line, and (ii) a cooling position in which fluid advanced by the temperature control operational pressure source is diverted to the housing input port of the wheel groups via the cooling fluid return line.

In accordance with a third embodiment of the present invention there is provided a method of controlling temperature of fluid in a rear axle housing. The method includes the steps of determining temperature of fluid in an internal component chamber of the rear axle housing; diverting fluid to a location within a rear axle sump positioned within the internal component chamber of the rear axle housing when the temperature has a first predetermined relation with a first temperature threshold; diverting fluid to a housing input port of the wheel group housings when the temperature does not have the first predetermined relation with the first temperature threshold; advancing fluid from said internal component chamber of the rear axle housing at a first flow rate when the temperature has a second predetermined relation with a second temperature threshold; and advancing fluid from the internal component chamber of the rear axle housing at a second flow rate when the temperature does not have the second predetermined relation with the second temperature threshold.

In accordance with a fourth embodiment of the present invention there is provided a method of controlling temperature of fluid in a rear axle housing of a vehicle. The method includes the steps of determining a velocity of the vehicle; determining temperature of fluid in an internal component chamber of the rear axle housing; diverting fluid to or from a location within a rear axle sump positioned within the internal component chamber of the rear axle housing when the temperature has a first predetermined relation with a first temperature threshold; diverting fluid to a housing input port of the wheel group housing when the temperature does not have the first predetermined relation with the first temperature threshold; advancing fluid from the internal component chamber of the rear axle housing when (i) the temperature has a second predetermined relation with a second temperature threshold while (ii) the velocity has a third predetermined relation with a velocity threshold; and advancing fluid from the internal component chamber of the rear axle housing when (i) the temperature does not have a second predetermined relation with a second temperature threshold while (ii) the velocity has a third predetermined relation with a velocity threshold.

BEST MODE FOR CARRYING OUT THE INVENTION

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 1:
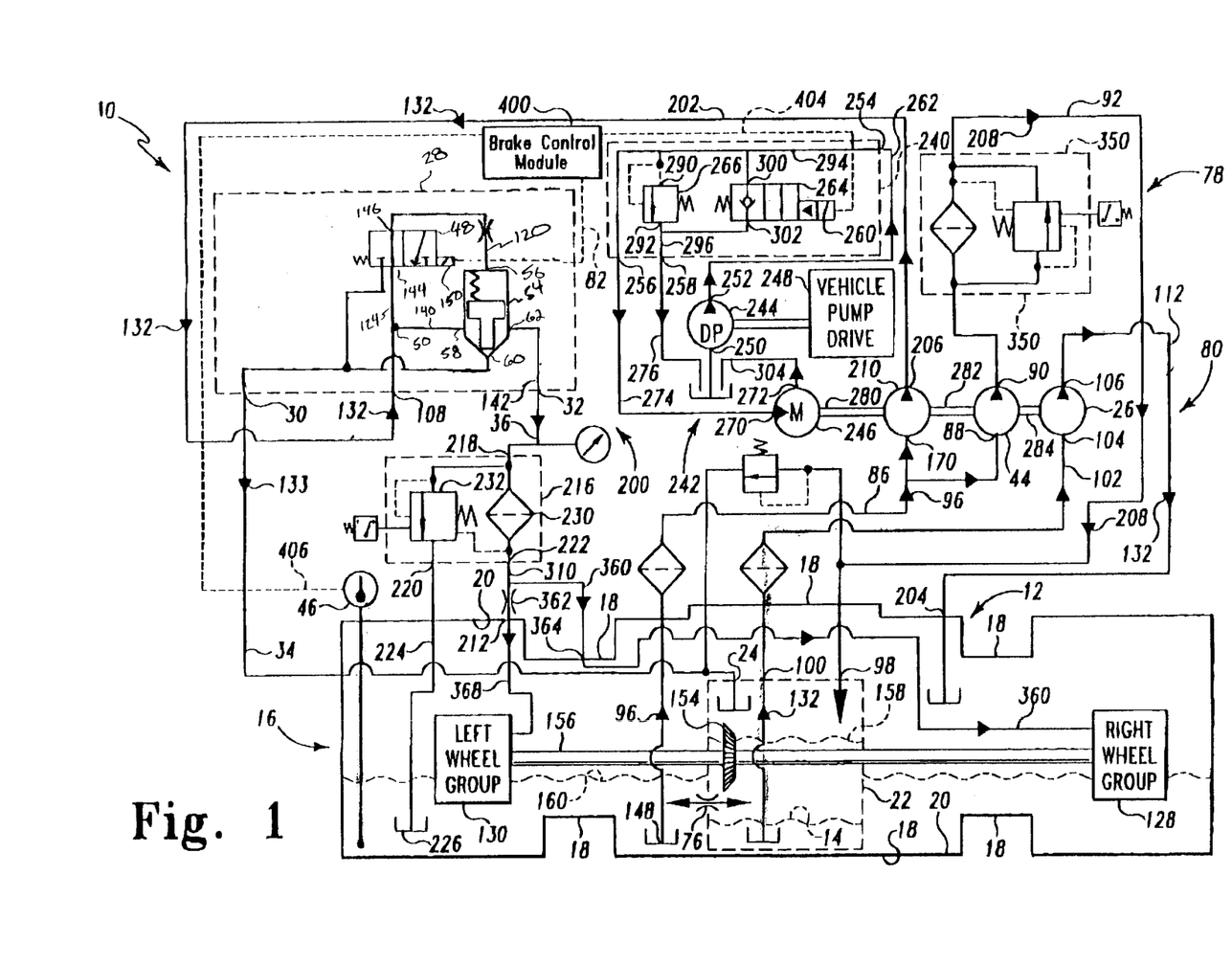
FIG. 1 is a schematic view of an apparatus for controlling temperature of fluid in a rear axle assembly which incorporates the features of the present invention therein.

Referring now to FIG. 1, there is shown an apparatus 10 for controlling temperature of fluid, such as oil, in a rear axle assembly 16 which incorporates the features of the present invention therein. Note that apparatus 10 and rear axle assembly 16 are incorporated into a work machine (not shown) such as a mining truck. Apparatus 10 includes a (i) rear axle housing 12 having a number of sidewalls 18 which collectively define an internal component chamber 20, (ii) a housing-to-sump fluid circuit 78, (iii) a sump-to-housing fluid circuit 80, and (iv) a temperature control fluid circuit 200.

Internal component chamber 20 of rear axle housing 12 has a rear axle sump 22, a right wheel group 128, and a left wheel group 130 located therein. Right wheel group 128 and left wheel group 130 are both mechanically coupled to an axle 156. Rear axle sump 22 has a sump input port 24, a sump rear axle port 98, and a sump output port 100 defined therein. As shown in FIG. 1, rear axle sump 22 also has a sump orifice 76 attached thereto. Sump orifice 76 allows fluid, such as oil, to flow within internal component chamber 20 from a location outside of rear axle sump 22 to a location within rear axle sump 22. Preferably, sump orifice 76 is configured to allow fluid to flow at a maximum rate of 3 gallons per minute. Rear axle sump 22 also has a gear 154 positioned therein which is mechanically coupled to axle 156. Gear 154 rotates along with axle 156 as the work machine performs various work functions.

Sump-to-housing fluid circuit 80 includes a sump-to-housing operational pressure source 26, a sump tap line 102, and a housing deposit line 112. Sump-to-housing operational pressure source 26 has a pressure source inlet port 104 and a pressure source outlet port 106. Pressure source inlet port 104 of sump-to-housing operational pressure source 26 is coupled to rear axle sump 22 via a sump tap line 102. It should be understood that sump tap line 102 is positioned relative to rear axle sump 22 such that an end of sump tap line 102 is submerged below a hot fluid level 14 and a cold fluid level 158 as schematically illustrated in FIG. 1. Having an end of sump tap line 102 submerged in the above described manner allows sump-to-housing operational pressure source 26 to withdraw fluid (e.g. oil) from rear axle sump 22 through sump output port 100. Additionally, pressure source outlet port 106 of sump-to-housing operational pressure source 26 is coupled to housing deposit line 112. Housing deposit line 112 is in fluid communication with housing input port 204 such that the fluid being discharged from an end of housing deposit line 112 is discharged to a location within rear axle housing 12. Having sump-to-housing operational pressure source 26 coupled to rear axle sump 22 and rear axle housing 12 in the above described manner allows sump-to-housing operational pressure source 26 to advance fluid from within rear axle sump 22 to rear axle housing 12 as indicated by arrowheads 132.

Housing-to-sump fluid circuit 78 includes a housing tap line 86, a housing-to-sump operational pressure source 44, a filter/bypass assembly 350, and a sump deposit line 92. Housing-to-sump operational pressure source 44 has an inlet port 88 and an outlet port 90. Inlet port 88 of housing-to-sump operational pressure source 44 is in fluid communication with internal component chamber 20 of rear axle housing 12 via housing tap line 86. It should be understood that inlet port 88 is in fluid communication with internal component chamber 20 so that housing-to-sump operational pressure source 44 withdraws fluid from internal component chamber 20 as indicated by arrowheads 96. In addition, it should be appreciated that housing-to-sump operational pressure source 44 withdraws fluid from internal component chamber 20 at a location outside of rear axle sump 22. Additionally, outlet port 90 of housing-to-sump operational pressure source 44 is coupled to rear axle sump 22 via filter/bypass assembly 350, sump deposit line 92, and sump input port 98. Ergo, it should be appreciated that the above described arrangement allows housing-to-sump operational pressure source 44 to (i) withdraw fluid from internal component chamber 20 at a location outside of rear axle sump 22 as indicated by arrowheads 96, (ii) filter the fluid, and (iii) return the filtered fluid to a location within rear axle sump 22 as indicated by arrowheads 208. Housing-to-sump operational pressure source 44 is mechanically coupled to sump-to-housing operational pressure source 26 via a shaft 284.

Temperature control fluid circuit 200 includes a temperature control operational pressure source 210, a diverter valve 28, a final drive filter 216, housing input port 212, and housing input port 364. As discussed further below, housing input port 212 is in fluid communication with at least one wheel bearing assembly (not shown) of left wheel group 130 and housing input port 364 is in fluid communication with at least one wheel bearing assembly (not shown) of right wheel group 128.

Temperature control operational pressure source 210 has an inlet port 170 and an outlet port 206. Inlet port 170 of temperature control operational pressure source 210 is in fluid communication with internal component chamber 20 of rear axle housing 12 via housing tap line 86. It should be understood that inlet port 170 is in fluid communication with internal component chamber 20 so that temperature control operational pressure source 210 withdraws fluid from internal component chamber 20 as indicated by arrowheads 96. In addition, it should be appreciated that temperature control operational pressure source 210 withdraws fluid from internal component chamber 20 at a location outside of rear axle sump 22. Additionally, outlet port 206 of temperature control operational pressure source 210 is coupled to diverter valve 28 via diverter valve supply line 202. Ergo, it should be appreciated that the above described arrangement allows temperature control operational pressure source 210 to withdraw fluid from internal component chamber 20 at a location outside of rear axle sump 22 and supply fluid to diverter valve 28 as indicated by arrowheads 132. Temperature control operational pressure source 210 is mechanically coupled to housing-to-sump operational pressure source 44 via a shaft 282.

Diverter valve 28 includes a solenoid valve 48 and a hot fluid return valve 54. Diverter valve 28 also has a cold fluid output port 30 and a hot fluid output port 32. Cold fluid output port 30 is coupled to sump input port 24 via a heating fluid return line 34. Hot fluid output port 32 is coupled to final drive filter 216 via a cooling fluid return line 36. Generally, diverter valve 28 is selectively operable between a heating position and a cooling position.

More particularly, solenoid valve 48 is selectively positionable between an open poppet position and a closed poppet position. Solenoid valve 48 has a poppet input 144, a poppet output 146, and a solenoid 150. Solenoid 150 is configured to position solenoid valve 48 in the open poppet position or the closed poppet position, respectively, depending on the magnitude of an electrical diverter valve drive signal. In the embodiment shown in FIG. 1, a brake control module 400 provides the electrical diverter valve drive signal to solenoid 150 via electrical line 82 as is further discussed below. One solenoid valve 48 which can be used in the present invention is available from Fluid Power Systems Inc. of Lincolnshire Ill., as catalogue number CV1367. Solenoid valve 48 is coupled to an operational pressure source output junction 50 via a fluid line 124.

Hot fluid return valve 54 is selectively positionable between an open hot fluid return position and a closed hot fluid return position. Hot fluid return valve 54 has (i) a control input 56 coupled to solenoid valve 48 via a fluid line 120, (ii) a hot source input 58 coupled to operational pressure source output junction 50 via a fluid line 140, and (iii) a hot source output 60 coupled to hot fluid output port 32 via a fluid line 142. One hot fluid return valve 54 which can be used in the present invention is available from Fluid Power Systems Inc. of Lincolnshire Ill., as catalogue number SV1161.

Next, final drive filter 216 includes a filter element 230 and a bypass valve 232. Final drive filter 216 has an input port 218, a bypass output port 220, and a filter output port 222. In a manner which is well known, final drive filter 216 is configured to (i) allow fluid to flow from its input port 218 to its filter output port 222 through its filter element 230, and (ii) to allow fluid to flow from its input port 218 to its bypass output port 220 when its filter element 230 becomes sufficiently blocked. Filter output port 222 is coupled to housing input port 212 via fluid line 310 and orifice 362. Filter output port 222 is also coupled to housing input port 364 via fluid line 310 and fluid line 360. Bypass output port 220 is coupled to bypass line 224. Bypass line 224 has an end portion 226 positioned within internal component chamber 20 of rear axle housing 12 at a location outside of rear axle sump 22.

Housing input port 212 is in fluid communication with at least one wheel group assembly of left wheel group 130 via fluid line 368. Housing input port 364 is in fluid communication with at least one wheel group assembly of right wheel group 128 via fluid line 360. In a manner which is well known, orifice 362 is configured to compensate for any difference in the pressure drops between fluid lines 368 and 360 such that the wheel bearing assemblies of left wheel group 130 and right wheel group 128 receive roughly equal amounts of fluid flow.

The embodiment shown in FIG. 1 further includes a drive fluid circuit 242. Drive fluid circuit 242 includes a motor 246, a drive pressure source 244, and an unloader/relief valve 240. Motor 246 has an input port 270 and an output port 272. Motor 246 is mechanically coupled to temperature control operational pressure source 210 via a shaft 280.

Drive pressure source 244 is mechanically coupled to an external vehicle pump drive 248 to receive mechanical power therefrom. External vehicle pump drive 248 may be any suitable external power source, and may suitably include, for example, an accessory drive of the work machine. Drive pressure source 244 has an input port 250 and an output port 252.

Unloader/relief valve 240 has an input port 254, a primary output port 256, and an unloader/relief output port 258. Input port 254 of unloader/relief valve 240 is coupled to output port 252 of drive pressure source 244 via a fluid line 262. Primary output port 256 of unloader/relief valve 240 is coupled to input port 270 of motor 246 via fluid line 274. Unloader/relief output port 258 of unloader/relief valve 240 is coupled to input port 250 of drive pressure source 244 via fluid line 276. Additionally, input port 250 of drive pressure source 244 is coupled to output port 272 of motor 246 via fluid line 304.

Unloader/relief valve 240 further includes a relief valve 266 and a bypass valve 264. Relief valve 266 has an input port 290 and an output port 292. Relief valve 266 is selectively positionable between an open position, in which it allows fluid to flow from its input port 290 to its output port 292, and a closed position, in which it inhibits fluid from flowing from its input port 290 to its output port 292. Input port 290 of relief valve 266 is coupled to input port 254 of unloader/relief valve 240 via fluid line 294. Output port 292 of relief valve 266 is coupled to unloader/relief output port 258 of unloader/relief valve 240 via fluid line 296.

Bypass valve 264 of unloader/relief valve 240 has a poppet input 300, a poppet output 302, and a solenoid 260. Bypass valve 264 is selectively positionable between (i) an open poppet position, in which it allows fluid to flow from its poppet input 300 to its poppet output 302, and (ii) a closed poppet position, in which it inhibits fluid from flowing from its poppet input 300 to its poppet output 302. More particularly, solenoid 260 is configured to position bypass valve 264 in the open poppet position or the closed poppet position, respectively, depending on the magnitude of an electrical unloader/relief drive signal. In the embodiment shown in FIG. 1, brake control module 400 provides the electrical unloader/relief drive signal to solenoid 260 via electrical line 404 as is further discussed below. Poppet input 300 is coupled to input port 254 of unloader/relief valve 240 via fluid line 294, and poppet output 302 is coupled to unloader/relief output 258 of unloader/relief valve 240 via a fluid line 296.

Temperature sensor 46 is positioned in contact with fluid pool 160, which is within internal component chamber 20 of rear axle housing 12 and outside of rear axle sump 22. Temperature sensor 46 is electrically coupled to brake control module 400 via signal line 406 and excitation line or lines (not shown). Temperature sensor 46 generates a temperature signal corresponding to the temperature of fluid pool 160. Temperature sensor 46 provides the temperature signal to brake control module 400 via signal line 406.

Brake control module 400 is generally a signal conditioning device which (i) provides electrical power to temperature sensor 46 via the excitation line or lines (not shown) as necessary, (ii) receives the temperature signal from temperature sensor 46, and (iii) converts the temperature signal into the electrical diverter valve drive signal for solenoid 150 of diverter valve 28 and into the electrical unloader/relief drive signal for solenoid 260 of unloader/relief valve 240. Thus, it should be appreciated that brake control module 400 effectively couples the temperature signal to diverter valve 28 and to unloader/relief valve 240. Additionally, in any of various suitable manners which are well known, brake control module 400 is configured as necessary to receive additional signals, such as, for example, a signal corresponding to the velocity of the work machine, and to further control the magnitudes of the electrical diverter valve drive signal and the unloader/relief diverter valve drive for operation of the apparatus 10 as described herein. To this end, it should be appreciated that brake control module 400 may be an analog or a digital type device, or may suitably include a combination of analog and digital components. In the preferred embodiment, brake control module 400 is a controller, such as, for example, a microcomputer or microcontroller controlled device.

INDUSTRIAL APPLICABILITY

Generally, during use of apparatus 10, housing-to-sump operational pressure source 44 circulates fluid through housing-to-sump fluid circuit 78. In particular, housing-to-sump operational pressure source 44 advances fluid from internal component chamber 20 through filter/bypass assembly 350 to a position located within rear axle sump 22 through a fluid path defined by housing tap line 86 and fluid line 92 as indicated by arrowheads 96 and arrowheads 208. Preferably, housing-to-sump operational pressure source 44 advances the fluid in the above described manner at a rate of 30 gallons per minute. Note that housing-to-sump fluid circuit 78 (i) withdraws fluid from internal component chamber 20 at a location outside of rear axle sump 22, (ii) filters the fluid, and (iii) returns fluid to internal component chamber 20 at a location within rear axle sump 22.

Meanwhile, sump-to-housing operational pressure source 26 circulates fluid through sump-to-housing fluid circuit 80. In particular, sump-to-housing operational pressure source 26 advances fluid from below a hot fluid level 14 and a cold fluid level 158 within rear axle sump 22 to rear axle housing 12 as indicated by sump tap line 102, housing deposit line 112, and arrowheads 132. Preferably, sump-to-housing operational pressure source 26 advances the fluid in the above described manner at a rate of 47 gallons per minute. Thus, it should be appreciated that sump-to-housing fluid circuit 80 operates in conjunction with housing-to-sump fluid circuit 78 to generally exchange and filter fluid between a location within rear axle sump 22 and a location outside of rear axle sump 22.

Temperature sensor 46 continuously determines the temperature of fluid pool 160 and sends the corresponding temperature signal to brake control module 400 via signal line 406. When the temperature signal has a first predetermined relationship with a first temperature threshold, brake control module 400 adjusts the magnitude of the electrical diverter valve drive signal to cause solenoid 150 to position solenoid valve 48 in the open poppet position; otherwise, brake control module 400 adjusts the magnitude of the electrical diverter valve drive signal to cause solenoid 150 to position solenoid valve 48 in the closed poppet position.

More particularly, when the temperature signal indicates that the temperature of the fluid within fluid pool 160 is less than 140° F., brake control module 400 causes solenoid 150 to position solenoid valve 48 in the open poppet position. Positioning solenoid valve 48 in the open poppet position puts diverter valve 28 in the heating position. On the other hand, when the temperature signal indicates that the temperature of the fluid pool 160 is substantially equal to or greater than 140° F., solenoid 150 positions solenoid valve 48 in the closed poppet position. Positioning solenoid valve 48 in the closed poppet position puts diverter valve 28 in the cooling position.

Temperature control operational pressure source 210 receives mechanical power from motor 246 via shaft 280 through operation of the drive fluid circuit 242 (discussed below). As temperature control operational pressure source 210 receives mechanical power, it advances fluid from outside rear axle sump 22 to diverter valve input port 108 through a fluid path defined by housing tap line 86, fluid line 202, arrowheads 96, and arrowheads 132.

Once the fluid reaches diverter valve input port 108, the fluid advances through hot fluid return valve 54 of solenoid valve 48, depending upon whether solenoid valve 48 is located in the open poppet position or the closed poppet position. In particular, when the temperature of the fluid is less than 140°, solenoid valve 48 is located in the open poppet position, thereby locating diverter valve 28 in the heating position. Having solenoid valve 48 located in the open poppet position allows fluid to be advanced from operational pressure source output junction 50 through solenoid valve 48 to poppet output 146. After reaching poppet output 146, the fluid advances to control input 56 of hot fluid return valve 54 via fluid line 120. Advancing fluid into hot fluid return valve 54 via control input 56 maintains hot fluid return valve 54 in a closed position such that no fluid can be advanced through a hot source output 60. As such, the fluid is advanced through cold fluid return valve 62 which results in the fluid being advanced to left wheel group 130 and right wheel group 128.

However, if the temperature of the fluid is substantially equal to or greater than 140°, solenoid valve 48 is located in the closed poppet position, thereby locating diverter valve 28 in the cooling position. When solenoid valve 48 is located in the closed position, fluid is prevented from being advanced into control input 56. However, when solenoid valve 48 is located in the closed poppet position, fluid is advanced into hot fluid return valve 54 via line 140 and hot source input 58. Advancing fluid into hot source input 58 causes hot source output 60 to be placed in an open position so that fluid can be advanced therethrough. Advancing fluid through hot source output 60 results in the fluid being advanced into rear axle sump 22.

Some of the fluid which flows from filter output port 222 of final drive filter 216 flows through fluid line 310 and orifice 362 to housing input port 212, and is then communicated to at least one wheel bearing assembly (not shown) of left wheel group 130 via fluid line 368. The remaining fluid which flows from filter output port 222 of final drive filter 216 flows through fluid line 310 and fluid line 360 to housing input port 364, and is then communicated to at least one wheel group assembly (not shown) of right wheel group 128 via fluid line 360. Causing the fluid to flow to the wheel group assemblies provides directed lubrication to the wheel group assemblies as is discussed further below in connection with the operation of apparatus 10 in a vehicle such as a mining truck. Additionally, causing the fluid to flow to the wheel group assemblies places the fluid within internal component chamber 20 so that s the fluid leaks back into fluid pool 160. However, fluid which flows from bypass output port 220 of final drive filter 216 does not flow directly to left wheel group 130 or right wheel group 128; instead, it is returned to internal component chamber 20 of rear axle housing 12 at a location outside of rear axle sump 22 via bypass line 224. This is done so that "contaminated" oil is not pumped to the wheel group assemblies.

In any event, having fluid pooled within internal component chamber allows the fluid to circulate around, lubricate, and further cool left wheel group 130 and right wheel group 128 ("the wheel groups") by splash action. It should also be appreciated that after the fluid is placed within internal component chamber 20 in the above described manner, some of the fluid (i) circulates through housing-to-sump fluid circuit 78 (this provides pressure lubrication to the gears and bearings in the rear axle), and (ii) some of the fluid slowly reenters rear axle sump 22 via sump orifice 76 and then circulates through sump-to-housing fluid circuit 80.

The drive fluid circuit 242 operates generally in the following manner. When the temperature signal has a second predetermined relationship with a second temperature threshold, brake control module 400 cause solenoid 260 to position bypass valve 264 in the open poppet position; otherwise, brake control module 400 causes solenoid 260 to position bypass valve 264 in the closed poppet position. More particularly, when the temperature signal indicates that the temperature fluid pool 160 is less than 25° F., brake control module 400 causes solenoid 260 to position bypass valve 264 in the open poppet position. On the other hand, when the temperature signal indicates that the temperature fluid pool 160 is substantially equal to or more than 25° F., brake control module 400 causes solenoid 260 to position bypass valve 264 in the closed poppet position.

Drive pressure source 244 receives mechanical power from external vehicle pump drive 248. When bypass valve 264 is positioned in the open position, drive pressure source 244 advances fluid primarily through a fluid circuit indicated by fluid line 262, fluid line 294, bypass valve 264, and fluid line 276. Thus, it should be appreciated that when bypass valve 264 is in the open position, only a relatively low fluid flow is advanced through motor 246, and, consequently, only a relatively low load is put on external vehicle pump drive 248. This also protects the filters, valves, pump and lubrication circuit in the rear axle from high pressures. Furthermore, it should be appreciated that because motor 246 is mechanically coupled to temperature control operational pressure source 210, housing-to-sump operational pressure source 44, and sump-to-housing operational pressure source 26 via shafts 280, 282, and 284, respectively, when this relatively low fluid flow is advanced through motor 246; i.e., when the temperature signal has a second predetermined relationship with a second temperature threshold, temperature control operational pressure source 210 is selectively operated at a first rate mode in which it advances fluid from internal component chamber 20 of the rear axle housing 12 at a first flow rate.

On the other hand, when bypass valve 264 is positioned in the closed position, drive pressure source 244 advances fluid primarily through a fluid circuit indicated by fluid line 262, fluid line 294, fluid line 274, motor 246, and fluid line 304. Thus, it should be appreciated that as the resulting relatively high fluid flow advances through motor 246; i.e., when the temperature signal does not have the second predetermined relationship with the second temperature threshold, temperature control operational pressure source 210 is selectively operated at a second rate mode in which it advances fluid from internal component chamber 20 of the rear axle housing 12 at a second flow rate. Preferably, this second flow rate is 34 gallons per minute.

When relief valve 266 is opened, drive pressure source 244 advances fluid primarily through a fluid circuit indicated by fluid line 262, fluid line 294, relief valve 266, and fluid line 276. Thus, it should be appreciated that to the extent that relief valve 266 is opened, a proportionally lower fluid flow is advanced through motor 246, and, consequently, a proportionally lower load is put on external vehicle pump drive 248. However, it should also be appreciated that relief valve 266 opens only to the extent that there is sufficient pressure in fluid line 94 to overcome its spring force. As a result, relief valve 266 acts to relieve excessive loads on external vehicle pump drive 248 and pumps oil filter which occur under cold operating conditions (as discussed below in connection with the operation of apparatus 10 within a mining truck).

In a vehicle such as a mining truck, apparatus 10 operates in the following manner. Primary lubrication of the left wheel group 130 and the right wheel group 128 ("the wheel groups") is by splash lube. At any instant, roughly half of the components of the wheel groups are rotating under the level of fluid pool 160 while the other half are above the oil. Various gears, bearings, and thrust washers (not shown) of the wheel groups receive the required lubrication by dipping in the oil or splash from other parts which are running through the oil bath. Additionally, the present invention provides directed lubrication oil flow and cooling of the wheel groups by advancing oil from rear axle housing 18, through final drive filter 216, through wheel bearings (not shown) within the wheel groups and back into rear axle housing 18. Oil from the wheel groups returns to rear axle housing 18 by gravity. It should be appreciated that this additional directed lubrication extends the wheel bearing life by providing added cooling the wheel bearings and by flushing debris out of the wheel bearing compartments.

The oil for directed lubrication passes through filter element 230 of final drive filter 216 before being advanced to the wheel groups. However, when filter element 230 becomes blocked, the unfiltered oil is bypassed (through bypass valve 232) directly back to rear axle housing 12 rather than being bypassed in-line (an in-line bypass could allow contaminated oil to flow to the wheel bearings). It should be noted that because the primary lubrication of the wheel groups is by splash lube, the wheel groups can operate for an extended period of time even when oil is bypassed directly back to rear axle housing 12.

When the temperature of the oil within fluid pool 160 is less than 25≅ F. ("unloading conditions"), it is impractical to advance the high viscosity oil through the fluid circuits of apparatus 10. So, during unloading conditions, brake control module 400 powers solenoid 260 of unloader/relief valve 240. This substantially unloads the external vehicle pump drive 248 and avoids significant circulation of oil throughout apparatus 10. However, it is noted that even during unloading conditions there is a relatively small pressure drop across unloader/relief valve 248, which causes a small amount of rotation of drive pressure source 244, and, therefore, results in some slight circulation of oil within apparatus 10.

When the temperature of the oil within fluid pool 160 is substantially equal to or greater than 25° F. and, preferably, when the vehicle is moving ("loading conditions"), brake control module 400 depowers solenoid 260 of unloader/relief valve 240, thereby allowing drive pressure source 244 to advance fluid through motor 246, which in turn causes temperature control operational pressure source 210, housing-to-sump operational pressure source 44, and sump-to-housing operational pressure source 26 to advance oil through their respective fluid circuits. However, when the oil temperature is substantially equal to or greater than 25° F. but is still also less than 140° F., the oil viscosity is still high enough to result in a pressure within drive fluid circuit 242 that is high enough to cause relief valve 266 to bypass some of the fluid in drive fluid circuit 242 away from motor 246, thereby relieving excessive loads on external pump drive 248.

Additionally, when the temperature of the oil within fluid pool 160 is less than 140° F. but greater than 20° F. ("cold operating conditions"), brake control module 400 powers solenoid 150, which puts diverter valve 28 in the heating position. As a result, temperature control operational pressure source 210 does not advance a significant amount of oil to the wheel groups via temperature control fluid circuit 242. It should be appreciated that if a significant amount of oil were advanced to the wheel groups when the oil was cold, the high viscosity of the cold oil combined with flow restrictions of the wheel groups would cause an undesirable accumulation of oil within the wheel groups and reduce the fluid pool 160 to an undesirably low level. Instead, during cold operating conditions diverter valve 28 diverts the oil in temperature control fluid circuit 242 directly into rear axle sump 22 via heating fluid return line 34. This provides at least two benefits. First, the wheel groups are not overfilled with cold oil. Second, the combined rate of flow of oil into rear axle sump 22 which is available from temperature control fluid circuit 242, sump orifice 76, and housing-to-sump fluid circuit 78 is roughly 67 gallons per minute, which is greater than the roughly 47 gallon per minute rate at which sump-to-housing fluid circuit 80 removes oil from rear axle sump 22. Consequently, the level of the oil within rear axle sump 22 quickly rises to cold fluid level 158. The elevated level of oil within rear axle sump 22 allows gear 154 to churn the oil, causing rapid mechanical heating of the oil.

On the other hand, when the temperature of the oil within fluid pool 160 is substantially equal to or greater than 140° F. ("normal operating conditions"), brake control module 400 depowers solenoid 150, which puts diverter valve 28 in the cooling position. During normal operating conditions, temperature control operational pressure source 210 advances oil (via temperature control fluid circuit 242) through diverter valve 28 to final drive filter 216. Oil from final drive filter 216 flows to the wheel groups (via fluid line 310) to the extent that filter element 230 of final drive filter 216 is not blocked, and is bypassed (via fluid line 224) directly to a location within internal component chamber 20 outside of rear axle sump 22 to the extent that filter element 230 is blocked. The oil advanced to the wheel groups provides directed lubrication as discussed above. It should be appreciated that during normal operating conditions, temperature control operational pressure source 210 does not advance a significant amount of oil directly to rear axle sump 22 via temperature control fluid circuit 242. As a result, the combined rate of flow of oil into rear axle sump 22 which is available from sump orifice 76 and housing-to-sump fluid circuit 78 is only roughly 33 gallons per minute, which is less than the roughly 47 gallon per minute rate at which sump-to-housing fluid circuit 80 attempts to remove oil from rear axle sump 22. Consequently, the level of the oil within rear axle sump 22 falls to hot fluid level 14. The reduced level of oil within rear axle sump 22 improves efficiency of the work machine by reducing the load on gear 154 and prevents excessive oil temperatures.

Brake control module 400 also depowers solenoid 150 when the temperature of the oil within fluid pool 160 is substantially equal to or less than 20° F. ("hysteresis mode"). Accordingly, diverter valve 28 is in the cooling position during hysteresis mode. However, this depowering of solenoid 150 occurs at a temperature (i.e. 20° F.) which is roughly 5° F. lower than the operative temperatures for the loading operations and the unloading operations discussed above (i.e. 25° F.). As a result, hysteresis mode ensures that diverter valve 28 is already in the heating position at the lowest temperature that the loading operations can commence as discussed above.

Preferably, when the vehicle has not been moving for 5 minutes or more and the temperature of the oil within fluid pool 160 drops to less than 135° F. ("idle operations"), brake control module 400 powers solenoid 260, which causes fluid in drive fluid circuit 242 to be bypassed through bypass valve 264 instead of being advanced though motor 246, thereby reducing the load on external vehicle pump drive 248 and avoiding significant circulation of oil throughout apparatus 10 in a manner consistent with operation during unloading conditions as discussed above. It should be appreciated that when the temperature of the oil within fluid pool 160 drops to less than 135° F., brake control module 400 has already powered solenoid 150, thereby putting diverter valve 28 in the heating position, which causes oil in the temperature control fluid circuit 242 to be diverted away from the wheel groups and into rear axle sump 22. It should be further appreciated that this desirably reduces the load on external vehicle pump drive 248 under conditions such as where the vehicle sits idling on a ready line over a weekend. Additionally, it slows down the rate at which the oil within apparatus 10 cools down when the vehicle has recently been in operation. However, any time that the vehicle begins moving while the temperature of the oil within fluid pool 160 is greater than 25° F., brake control module 400 depowers solenoid 260, which causes fluid in drive fluid circuit 242 to advance through motor 246 in a manner consistent with operation during loading conditions as discussed above.

Thus, it should be appreciated that having (i) a relatively high fluid level (i.e. cold fluid level 158) within rear axle sump 22 during cold operating conditions and (ii) a relatively low fluid level (i.e. hot fluid level 14) once the fluid is heated to an appropriate temperature is an important aspect of the present invention. Specifically, this aspect of the present invention allows the fluid to be efficiently heated during cold start up conditions and then prevents the loss of horse power once the has fluid attained the appropriate temperature.

Moreover, the present invention ensures that the fluid is substantially kept within an appropriate predetermined temperature range, thereby preventing the fluid from becoming too hot as the work machine performs various work functions.

A further advantage of the present invention is that it ensures that right wheel group 128 and left wheel group 130 are always cooled and lubricated by the fluid. In particular, having solenoid valve 48 positioned in the open poppet position only if solenoid 150 is electrically actuated ensures that the fluid will be diverted to internal component chamber 20 at a location outside of rear axle sump 22 in the event of an electrical failure. For example, if an electrical failure causes solenoid valve 48 to be cut off from an electric current, then solenoid 150 will be deactuated. Deactuating solenoid 150 results in solenoid valve 48 being positioned in the closed poppet position. Placing solenoid valve 48 in the closed poppet position places diverter valve 28 in the cooling position. Having diverter valve 28 in the cooling position ensures that right wheel group 128 and left wheel group 130 are lubricated and cooled by the fluid.

The present invention also reduces peek loads on the external vehicle pump drive 248 during cold operating conditions, when the viscosity of the fluid is relatively high.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

Other aspects and features of the present invention can be obtained from a study of the drawing(s), the disclosure, and the appended claims.

What is claimed is:

1. An apparatus for controlling temperature of fluid in a rear axle assembly, the apparatus comprising:
  a rear axle housing having a number of sidewalls which collectively define an internal component chamber, wherein (i) said internal component chamber has a rear axle sump located therein, and (ii) said rear axle sump has a sump input port defined therein;
  a temperature control operational pressure source coupled to said internal component chamber of said rear axle housing to advance fluid therefrom;
  a diverter valve coupled to said temperature control operational pressure source to receive fluid advanced from said internal component chamber by said temperature control operational pressure source, said diverter valve having a cold fluid output port and a hot fluid output port;
  a heating fluid return line interposed between said cold fluid output port of said diverter valve and said sump input port of said rear axle sump; and
  a cooling fluid return line interposed between said hot fluid output port of said diverter valve and a housing input port of said rear axle housing;
  wherein said temperature control operational pressure source is selectively operable between (i) a first rate mode in which it advances fluid from said internal component chamber of said rear axle housing at a first flow rate, and (ii) a second rate mode in which it advances fluid from said internal component chamber of said rear axle housing at a second flow rate; and
  wherein said diverter valve is selectively operable between (i) a heating position in which fluid advanced by said temperature control operational pressure source is diverted to said rear axle sump of said rear axle housing via said heating fluid return line, and (ii) a cooling position in which fluid advanced by said temperature control operational pressure source is diverted to said housing input port of said rear axle housing via said cooling fluid return line.

2. The apparatus of claim 1, wherein:
  said housing input port of said rear axle housing is in fluid communication with a wheel group assembly.

3. The apparatus of claim 1, further comprising:
  a temperature sensor coupled to said diverter valve to provide a temperature signal thereto, said temperature sensor operable to generate said temperature signal in response to a temperature of fluid within said internal component chamber.

4. The apparatus of claim 3, wherein:
  said diverter valve is positioned in said heating position if said temperature signal has a first predetermined relationship with a first temperature threshold, and
  said diverter valve is positioned in said cooling position if said temperature signal does not have said first predetermined relationship with said first temperature threshold.

5. The apparatus of claim 1, wherein said diverter valve includes:
  a poppet valve interposed between an operational pressure source output junction and a poppet output junction, said poppet valve being selectively positionable between an open poppet position and a closed poppet position;
  a hot fluid return valve having (i) a control input coupled to said poppet output junction, (ii) a hot source input coupled to said operational pressure source output junction, and (iii) a hot source output coupled to said hot fluid output port, wherein said hot fluid return valve is selectively positionable between an open hot fluid return position and a closed hot fluid return position;
  a cold fluid return valve having (i) a cold source input coupled to said operational pressure source output junction, and (ii) a cold source output coupled to a cold fluid return output junction, wherein said cold fluid return valve is selectively positionable between an open cold fluid return position and a closed cold fluid return position; and
  a fixed orifice interposed between said cold fluid return output junction and said poppet output junction.

6. The apparatus of claim 5, wherein:
  said hot fluid return valve is positioned in said closed hot fluid return position when said poppet valve is positioned in said open poppet position such that fluid is advanced through said cold fluid return valve whereby fluid is advanced to said rear axle sump of said rear axle housing via said heating fluid return line, and said hot fluid return valve is positioned in said open hot fluid return position when said poppet valve is positioned in said closed poppet position such that fluid is advanced through said hot fluid return valve whereby fluid is diverted to said housing input port of said rear axle housing via said cooling fluid return line.

7. The apparatus of claim 5, wherein:

said cold fluid return valve is positioned in said open cold fluid return position when said poppet valve is positioned in said open poppet position such that fluid is advanced through said cold fluid return valve whereby fluid is advanced to said rear axle sump of said rear axle housing via said heating fluid return line, and said cold fluid return valve is positioned in said closed cold fluid return position when said poppet valve is positioned in said closed poppet position such that fluid is advanced through said hot fluid return valve whereby fluid is diverted to said housing input port of said rear axle housing via said cooling fluid return line.

8. The apparatus of claim 5, further comprising:

a temperature sensor coupled to said diverter valve to provide a temperature signal thereto, said temperature sensor operable to generate said temperature signal in response to a temperature of fluid within said internal component chamber;

wherein said poppet valve is positioned in said closed poppet position so as to locate said diverter valve in said cooling position if said temperature signal has a first predetermined relationship with a first temperature threshold, and said poppet valve is positioned in said open poppet position so as to locate said diverter valve in said heating position if said temperature signal does not have said first predetermined relationship with said first temperature threshold.

9. The apparatus of claim 1, wherein:

when said diverter valve is positioned in said heating position, fluid advanced by said temperature control operational pressure source is diverted to a location within said rear axle sump, and when said diverter valve is positioned in said cooling position, fluid advanced by said temperature control operational pressure source is diverted to a location within said internal component chamber which is located outside of said rear axle sump.

10. The apparatus of claim 1, further comprising:

a sump orifice positioned within said internal component chamber which allows fluid to flow within said internal component chamber from a location outside of said rear axle sump to a location within said rear axle sump.

11. The apparatus of claim 1, further comprising:

a drive fluid circuit coupled to said temperature control operational pressure source to provide operational powers thereto, said drive fluid circuit operable to receive a drive power from an external power source, said drive fluid circuit further operable to selectively convert said drive power to a first operational power and a second operational power.

12. The apparatus of claim 11, further comprising:

a temperature sensor coupled to said drive fluid circuit to provide a temperature signal thereto, said temperature sensor operable to generate said temperature signal in response to a temperature of fluid within said internal component chamber;

wherein said drive fluid circuit is operable to provide said first operational power to said temperature control operational pressure source if said temperature signal has a second predetermined relationship with a second temperature threshold, and said drive fluid circuit is operable to provide said second operational power to said temperature control operational pressure source if said temperature signal does not have said second predetermined relationship with said second temperature threshold;

whereby said temperature control operational pressure source is operable in said first rate mode when said temperature signal has said second predetermined relationship with said second temperature threshold, and said temperature control operational pressure source is operable in said second rate mode when said temperature signal does not have said second predetermined relationship with said second temperature threshold.

13. The apparatus of claim 12, wherein said drive fluid circuit includes:

a drive pressure source having (i) a first drive fluid input port, (ii) a second drive fluid input port, and (iii) a drive fluid output port;

an unloader/relief valve having (i) an unloader/relief valve control input coupled to said temperature sensor to receive said temperature signal therefrom, (ii) an unloader/relief valve input port coupled to said drive fluid output port to receive drive fluid circuit fluid therefrom, (iii) a first unloader/relief valve output port coupled to said first drive fluid input port to bypass drive fluid circuit fluid thereto, and (iv) a second unloader/relief valve output port; and a motor having (i) a motor input port coupled to said second unloader/relief valve output port to receive drive fluid circuit fluid therefrom, and (ii) a motor output port coupled to said second drive fluid input port to return said drive fluid circuit fluid thereto;

wherein said drive pressure source is operable to advance said drive fluid from said drive fluid output port in response to said drive power.

14. An apparatus for controlling temperature of fluid in a rear axle assembly, the apparatus comprising:

a rear axle housing having a number of sidewalls which collectively define an internal component chamber, wherein (i) said internal component chamber has a rear axle sump located therein, and (ii) said rear axle sump has a sump input port defined therein;

a temperature control operational pressure source coupled to said internal component chamber of said rear axle housing to advance fluid therefrom;

a diverter valve coupled to said temperature control operational pressure source to receive fluid advanced from said internal component chamber by said temperature control operational pressure source, said diverter valve having a cold fluid output port and a hot fluid output port;

a heating fluid return line interposed between said cold fluid output port of said diverter valve and said sump input port of said rear axle sump; and a cooling fluid return line interposed between said hot fluid output port of said diverter valve and a housing input port of said rear axle housing, said housing input port of said rear axle housing being in fluid communication with a wheel group assembly;

wherein said temperature control operational pressure source is selectively operable between (i) a first rate mode in which it advances fluid from said internal component chamber of said rear axle housing at a first flow rate, and (ii) a second rate mode in which it advances fluid from said internal component chamber of said rear axle housing at a second flow rate; and wherein said diverter valve is selectively operable between (i) a heating position in which fluid advanced by said temperature control operational pressure source is diverted to said rear axle sump of said rear axle housing via said heating fluid return line, and (ii) a cooling position in which fluid advanced by said temperature control operational pressure source is diverted to said housing input port of said rear axle housing via said cooling fluid return line.

15. The apparatus of claim 14, further comprising:

a temperature sensor coupled to said diverter valve to provide a temperature signal thereto, said temperature sensor operable to generate said temperature signal in response to a temperature of fluid within said internal component chamber;

wherein said diverter valve is positioned in said heating position if said temperature signal has a first predetermined relationship with a first temperature threshold, and said diverter valve is positioned in said cooling position if said temperature signal does not have said first predetermined relationship with said first temperature threshold.

16. The apparatus of claim 15, wherein said diverter valve includes:

a poppet valve interposed between an operational pressure source output junction and a poppet output junction, said poppet valve being selectively positionable between an open poppet position and a closed poppet position;

a hot fluid return valve having (i) a control input coupled to said poppet output junction, (ii) a hot source input coupled to said operational pressure source output junction, and (iii) a hot source output coupled to said hot fluid output port, wherein said hot fluid return valve is selectively positionable between an open hot fluid return position and a closed hot fluid return position;

a cold fluid return valve having (i) a cold source input coupled to said operational pressure source output junction, and (ii) a cold source output coupled to a cold fluid return output junction, wherein said cold fluid return valve is selectively positionable between an open cold fluid return position and a closed cold fluid return position; and a fixed orifice interposed between said cold fluid return output junction and said poppet output junction.

17. The apparatus of claim 16, wherein:

said hot fluid return valve is positioned in said closed hot fluid return position when said poppet valve is positioned in said open poppet position such that fluid is advanced through said cold fluid return valve whereby fluid is advanced to said rear axle sump of said rear axle housing via said heating fluid return line, said hot fluid return valve is positioned in said open hot fluid return position when said poppet valve is positioned in said closed poppet position such that fluid is advanced through said hot fluid return valve whereby fluid is diverted to said housing input port of said rear axle housing via said cooling fluid return line, said cold fluid return valve is positioned in said open cold fluid return position when said poppet valve is positioned in said open poppet position such that fluid is advanced through said cold fluid return valve whereby fluid is advanced to said rear axle sump of said rear axle housing via said heating fluid return line, and said cold fluid return valve is positioned in said closed cold fluid return position when said poppet valve is positioned in said closed poppet position such that fluid is advanced through said hot fluid return valve whereby fluid is diverted to said housing input port of said rear axle housing via said cooling fluid return line.

18. The apparatus of claim 17, wherein:

said poppet valve is positioned in said closed poppet position so as to locate said diverter valve in said cooling position if said temperature signal has said first predetermined relationship with said first temperature threshold, and said poppet valve is positioned in said open poppet position so as to locate said diverter valve in said heating position if said temperature signal does not have said first predetermined relationship with said first temperature threshold.

19. The apparatus of claim 18, further comprising:

a drive fluid circuit coupled to said temperature control operational pressure source to provide operational powers thereto, said drive fluid circuit operable to receive a drive power from an external power source, said drive fluid circuit further operable to selectively convert said drive power to a first operational power and a second operational power.

20. The apparatus of claim 19, wherein:

said temperature sensor is also coupled to said drive fluid circuit to provide said temperature signal thereto, and said drive fluid circuit is operable to provide said first operational power to said temperature control operational pressure source if said temperature signal has a second predetermined relationship with a second temperature threshold, and said drive fluid circuit is operable to provide said second operational power to said temperature control operational pressure source if said temperature signal does not have said second predetermined relationship with said second temperature threshold;

whereby said temperature control operational pressure source is operable in said first rate mode when said temperature signal has said second predetermined relationship with said second temperature threshold, and said temperature control operational pressure source is operable in said second rate mode when said temperature signal does not have said second predetermined relationship with said second temperature threshold.

21. The apparatus of claim 20, wherein said drive fluid circuit includes:

a drive pressure source having (i) a first drive fluid input port, (ii) a second drive fluid input port, and (iii) a drive fluid output port;

an unloader/relief valve having (i) an unloader/relief valve control input coupled to said temperature sensor to receive said temperature signal therefrom, (ii) an unloader/relief valve input port coupled to said drive fluid output port to receive drive fluid circuit fluid therefrom, (iii) a first unloader/relief valve output port coupled to said first drive fluid input port to bypass drive fluid circuit fluid thereto, and (iv) a second unloader/relief valve output port; and a motor having (i) a motor input port coupled to said second unloader/relief valve output port to receive drive fluid circuit fluid therefrom, and (ii) a motor output port coupled to said second drive fluid input port to return said drive fluid circuit fluid thereto;

wherein said drive pressure source is operable to advance said drive fluid from said drive fluid output port in response to said drive power.

22. The apparatus of claim 21, wherein:

when said diverter valve is positioned in said heating position, fluid advanced by said temperature control operational pressure source is diverted to a location within said rear axle sump, and when said diverter valve is positioned in said cooling position, fluid advanced by said temperature control operational pressure source is diverted to a location within said internal component chamber which is located outside of said rear axle sump.

23. The apparatus of claim 22, further comprising:

a sump orifice positioned within said internal component chamber which allows fluid to flow within said internal component chamber from a location outside of said rear axle sump to a location within said rear axle sump.

24. A method of controlling a temperature of a fluid pool within an internal component chamber of a rear axle housing, the method comprising the steps of:

determining said temperature;

diverting fluid to a location within a rear axle sump positioned within said internal component chamber of said rear axle housing when said temperature has a first predetermined relation with a first temperature threshold;

diverting fluid to a housing input port of said rear axle housing when said temperature does not have said first predetermined relation with said first temperature threshold;

advancing fluid from said internal component chamber of said rear axle housing at a first flow rate when said temperature has a second predetermined relation with a second temperature threshold; and advancing fluid from said internal component chamber of said rear axle housing at a second flow rate when said temperature does not have said second predetermined relation with said second temperature threshold.

25. The method of claim, further including the step of:

generating a temperature signal which corresponds to said temperature;

controlling a diverter valve with said temperature signal.

26. A method of controlling a temperature of a fluid pool in an internal component chamber of a rear axle housing of a vehicle, the method comprising the steps of:

determining when said vehicle is moving;

determining said temperature;

diverting fluid to a location within a rear axle sump positioned within said internal component chamber of said rear axle housing 12 when said temperature has a first predetermined relation with a first temperature threshold;

diverting fluid to a housing input port of said rear axle housing when said temperature does not have said first predetermined relation with said first temperature threshold;

advancing fluid from said internal component chamber of said rear axle housing at a first flow rate when (i) said temperature has a second predetermined relation with a second temperature threshold while (ii) said vehicle is moving; and advancing fluid from said internal component chamber of said rear axle housing at a second flow rate when (i) said temperature does not have a second predetermined relation with a second temperature threshold while (ii) said vehicle is moving.

* * * * *